(12) United States Patent
Caveney et al.

(10) Patent No.: US 7,345,241 B2
(45) Date of Patent: Mar. 18, 2008

(54) CABLE MANAGEMENT SUPPORT BAR WITH STRAIN RELIEF CLAMPS

(75) Inventors: Jack E. Caveney, Hinsdale, IL (US); Jason O'Young, Oak Forest, IL (US)

(73) Assignee: Panduit Corp., Tinley Park, IL (US)

( * ) Notice: Subject to any disclaimer, the term of this patent is extended or adjusted under 35 U.S.C. 154(b) by 67 days.

(21) Appl. No.: 11/038,322

(22) Filed: Jan. 18, 2005

(65) Prior Publication Data
US 2006/0171075 A1   Aug. 3, 2006

(51) Int. Cl.
*H02G 3/04* (2006.01)
(52) U.S. Cl. ............. 174/99 R; 174/68.3; 174/73.1; 174/98; 174/135; 248/68.1; 439/471
(58) Field of Classification Search ......... 174/68.3, 174/73.1, 98, 99 R, 100, 135, 481, 503; 24/297; 248/68.1, 71, 74.2, 74.3; 385/136; 439/471
See application file for complete search history.

(56) References Cited

U.S. PATENT DOCUMENTS

| | | | |
|---|---|---|---|
| 3,954,238 A * | 5/1976 | Nivet | 248/68.1 |
| 4,564,163 A * | 1/1986 | Barnett | 248/71 |
| 4,623,102 A * | 11/1986 | Hough, Jr. | 248/74.3 |
| 5,127,082 A | 6/1992 | Below et al. | |
| 5,184,794 A * | 2/1993 | Saito | 248/68.1 |
| 5,422,436 A * | 6/1995 | Zachrai | 174/666 |
| 5,535,969 A * | 7/1996 | Duffy, Jr. | 248/68.1 |
| 5,559,922 A | 9/1996 | Arnett | |
| 5,566,268 A | 10/1996 | Radliff et al. | |
| 5,566,269 A | 10/1996 | Eberle, Jr. et al. | |
| 5,613,655 A * | 3/1997 | Marion | 248/68.1 |
| 5,668,910 A | 9/1997 | Arnett | |
| 5,669,590 A * | 9/1997 | Przewodek | 248/68.1 |
| 5,675,128 A * | 10/1997 | Simon | 174/135 |
| 5,820,048 A * | 10/1998 | Shereyk et al. | 248/68.1 |
| 5,862,291 A | 1/1999 | Stockman et al. | |
| 6,009,223 A | 12/1999 | Arizpe | |
| 6,278,830 B1 | 8/2001 | Levesque et al. | |
| 6,396,992 B1 | 5/2002 | Debal | |
| 6,456,772 B1 | 9/2002 | Daoud | |
| 6,461,052 B1 | 10/2002 | Hines et al. | |
| 6,528,728 B1 | 3/2003 | Shima | |
| 6,539,161 B2 | 3/2003 | Holman et al. | |
| 6,592,266 B1 | 7/2003 | Hankins et al. | |
| 6,600,106 B2 * | 7/2003 | Standish et al. | 174/68.3 |
| 6,771,871 B2 | 8/2004 | Krampotich et al. | |
| 2003/0108322 A1 | 6/2003 | Douglas et al. | |

* cited by examiner

*Primary Examiner*—Dhiru R. Patel
(74) *Attorney, Agent, or Firm*—Robert A. McCann; Christopher S. Clancy; Aimee E. McVady

(57) ABSTRACT

A clamp that guides and secures cables in a cable management system. The clamp includes a body member and latch members integrally formed with the body member. The body member includes at least one cable guide and the latch members include outwardly extending arms. The latch members pivot from an open position to a closed position over the body member. When the latch members are in the closed position, each arm is disposed over a cable guide to secure a cable positioned therein.

26 Claims, 15 Drawing Sheets

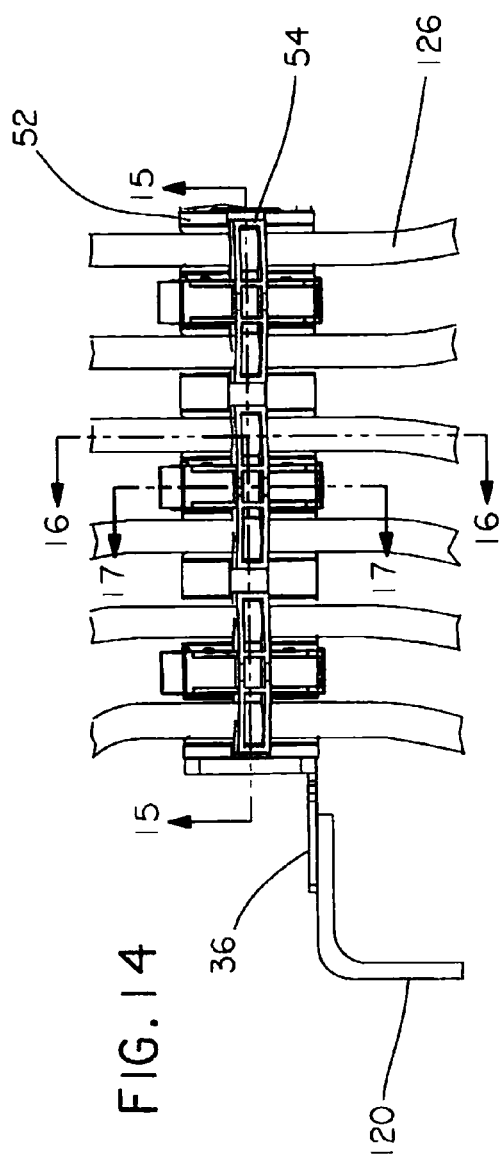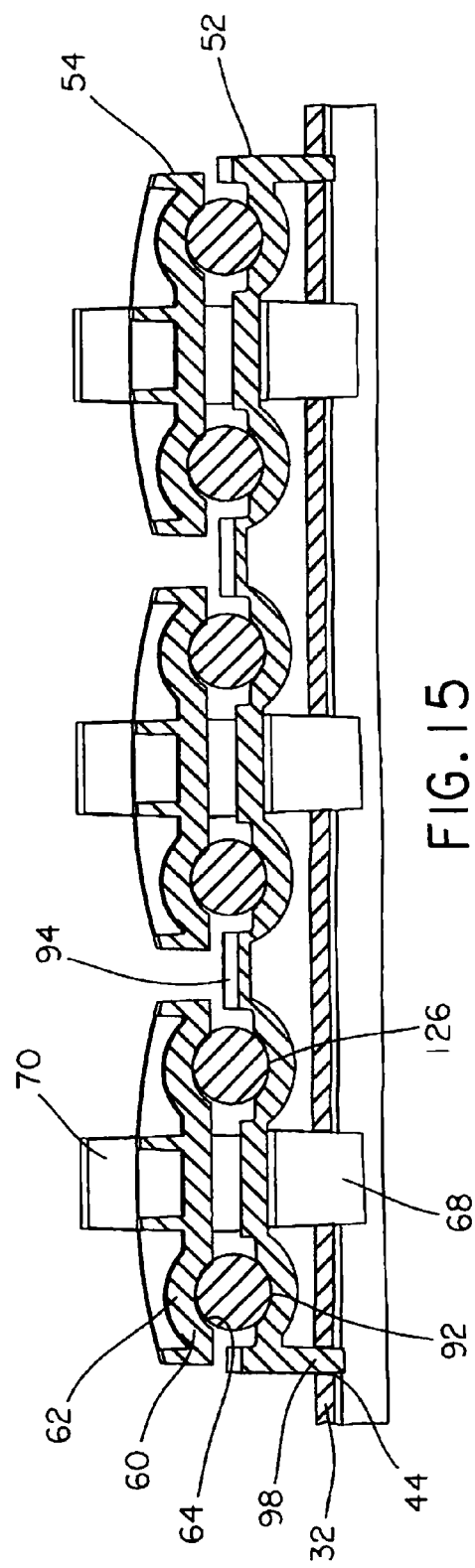

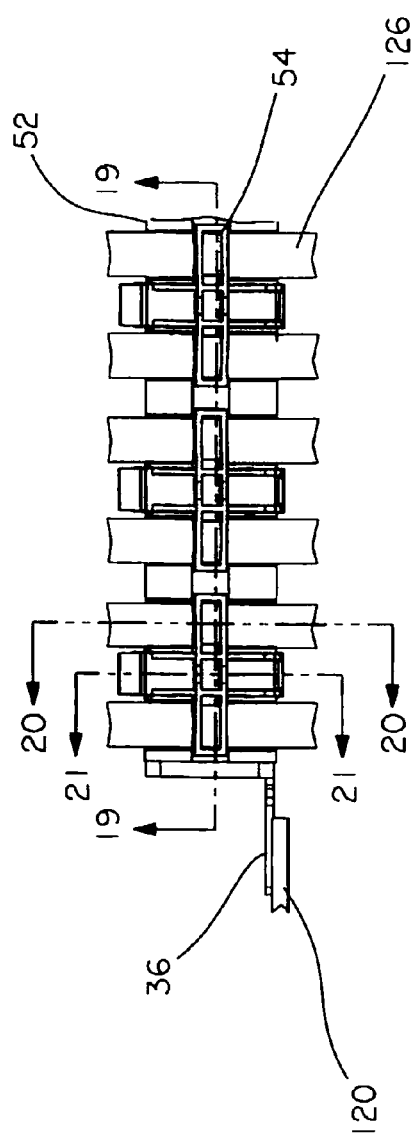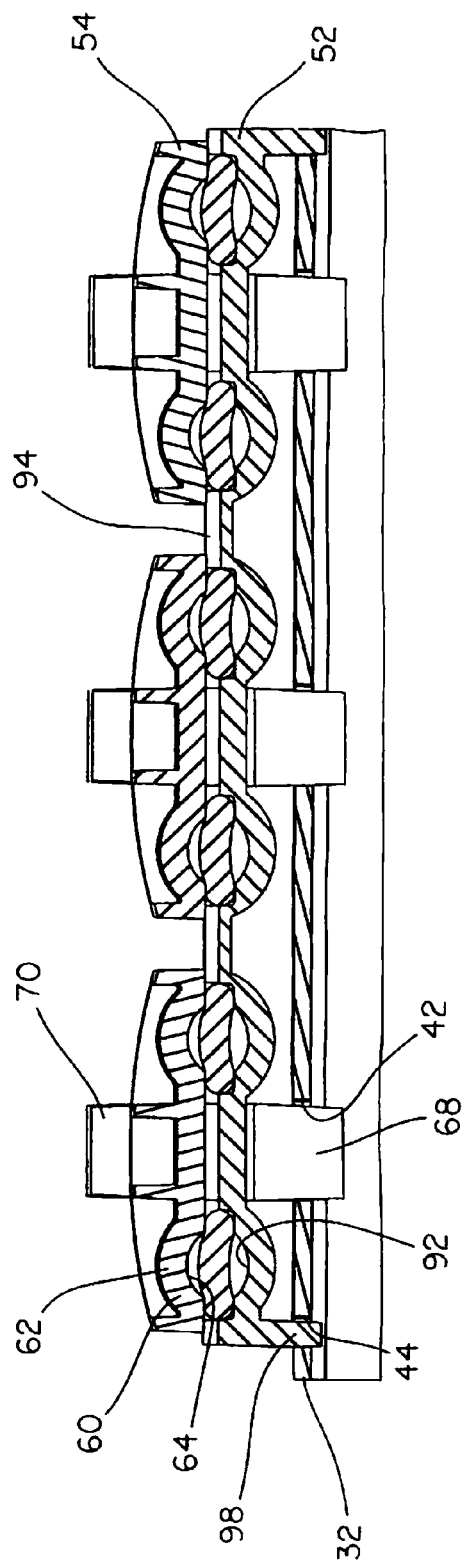
FIG.18
FIG.19

CABLE MANAGEMENT SUPPORT BAR WITH STRAIN RELIEF CLAMPS

FIELD OF THE INVENTION

The present invention relates to a cable management system, and more particularly to a cable management support bar with strain relief clamps for holding cables in a cable management system.

BACKGROUND OF THE INVENTION

Telecommunication systems include equipment racks or frames to which communication connectors are mounted. The associated cabling is routed through and around the racks to another destination within the rack system or at a device. Either during installation, or at the time of revisions to the system, cables may become intertwined or bent as cables are directed through the system. This can result in undesirable strain on the cable where it is terminated to a connector module. Thus, it is desirable to provide a device that helps guide the cables and provides strain relief on the cables as the cables are directed through the system.

SUMMARY OF THE INVENTION

The present invention is directed to a clamp that secures cables in a cable management system. The clamp includes a body member and latch members integrally formed with the body member. The body member has a number of cable guides designed to support various cables. The latch members include outwardly extending arms. The latch members pivot from an open position to a closed position where the arms are disposed over the cable guide for securing the cables positioned therein.

BRIEF DESCRIPTION OF THE DRAWINGS

FIG. 14 illustrates a top view of the cable management support bar with the strain relief clamps of the present invention securing a cable having a large diameter;

FIG. 15 illustrates a cross sectional view of the cable management support bar with the strain relief clamps taken along line 15-15 of FIG. 14;

FIG. 18 illustrates a top view of the cable management support bar with the strain relief clamps of the present invention securing a flat cable;

FIG. 19 illustrates a cross sectional view of the cable management support bar with the strain relief clamps taken along line 19-19 of FIG. 18;

DETAILED DESCRIPTION

Figure 1:
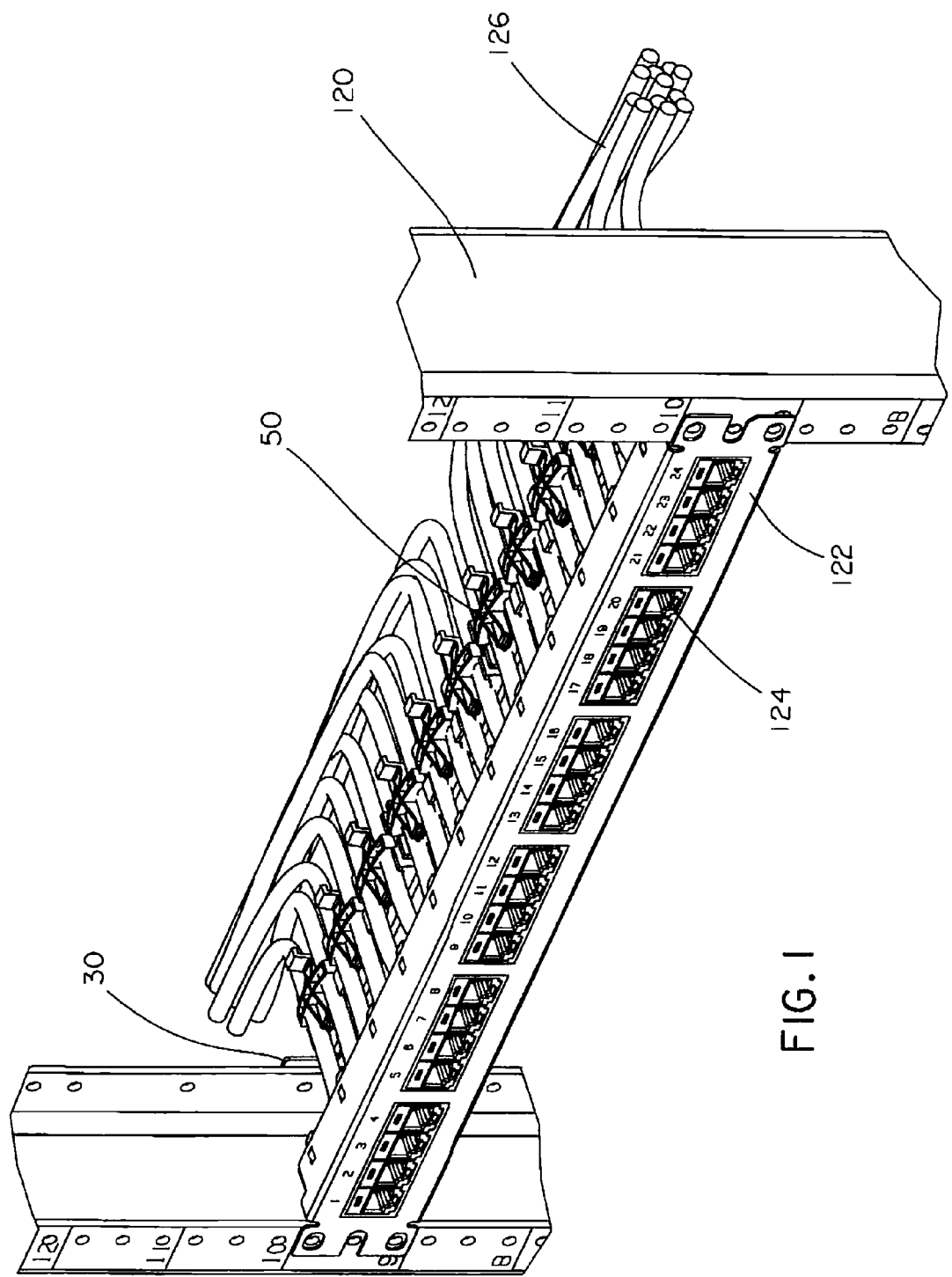
FIG. 1 illustrates a front perspective view of the cable management support bar with strain relief clamps in the closed position to secure the cables positioned therein.
Figure 2:
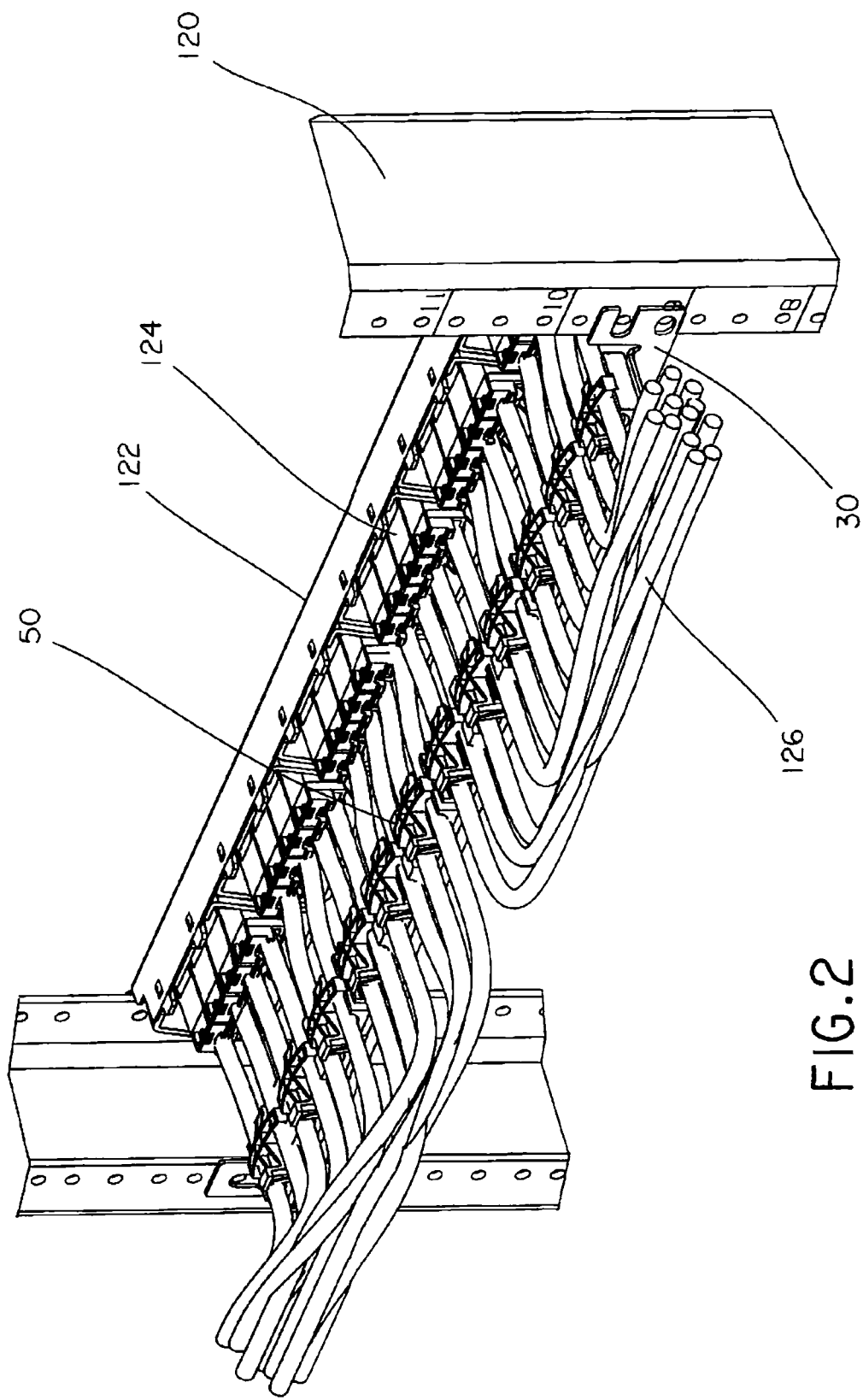
FIG. 2 illustrates a rear perspective view of the cable management support bar with the strain relief clamps securing the cables positioned therein of FIG. 1.

FIGS. 1 and 2 illustrate an exemplary application of the cable management support bar 30 and strain relief clamps 50 of the present invention. The strain relief clamps 50 are secured to the support bar 30 so that the strain relief clamps 50 are able to guide the cables 126 extending from the network modules 124 installed in the patch panel 122. The strain relief clamps 50 hold the cables 126 in place when the cables are pulled in various directions. Thus, the strain relief clamps 50 support the cables 126 and relieve the strain on the cables 126 as the cables 126 are routed through the rack system.

Figure 3:
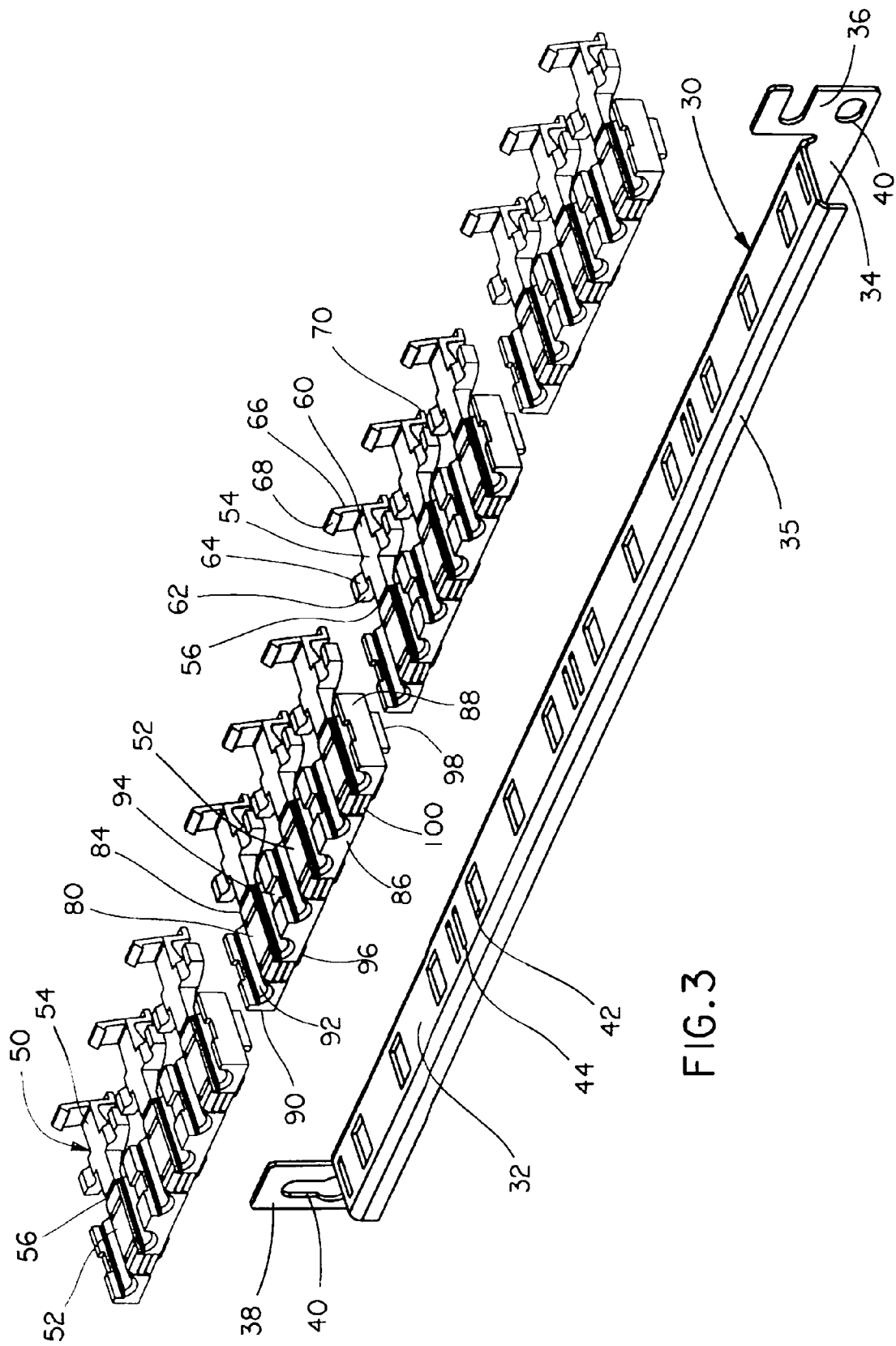
FIG. 3 illustrates an exploded view of the strain relief clamps and the cable management support bar illustrated in FIG. 1.
Figure 4:
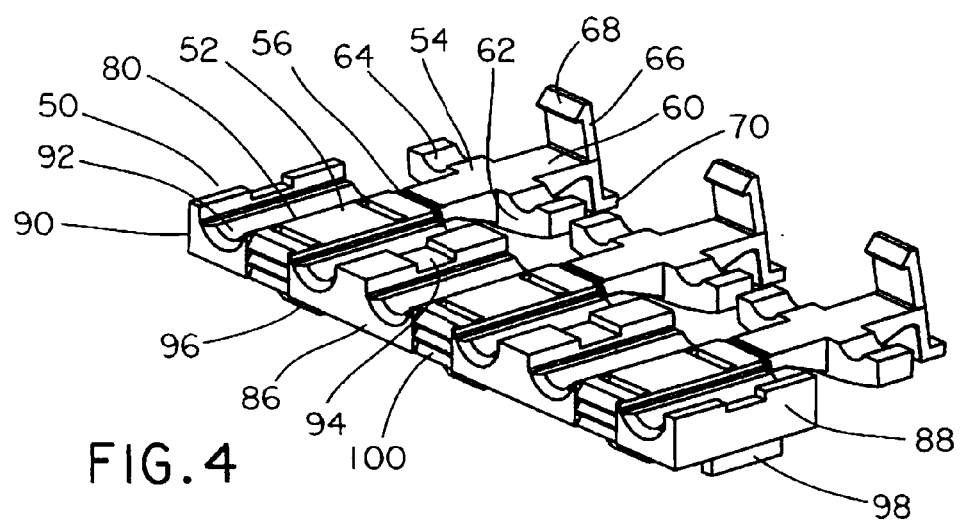
FIG. 4 illustrates a rear top perspective view of the strain relief clamps illustrated in FIG. 3.
Figure 5:
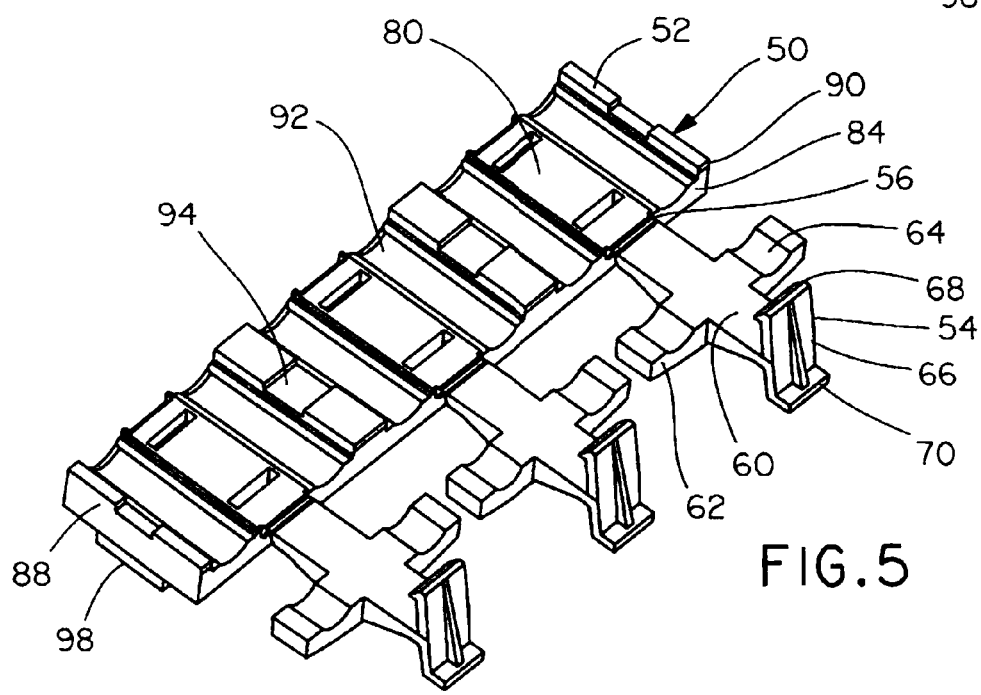
FIG. 5 illustrates a front top perspective view of the strain relief clamps illustrated in FIG. 3.
Figure 6:
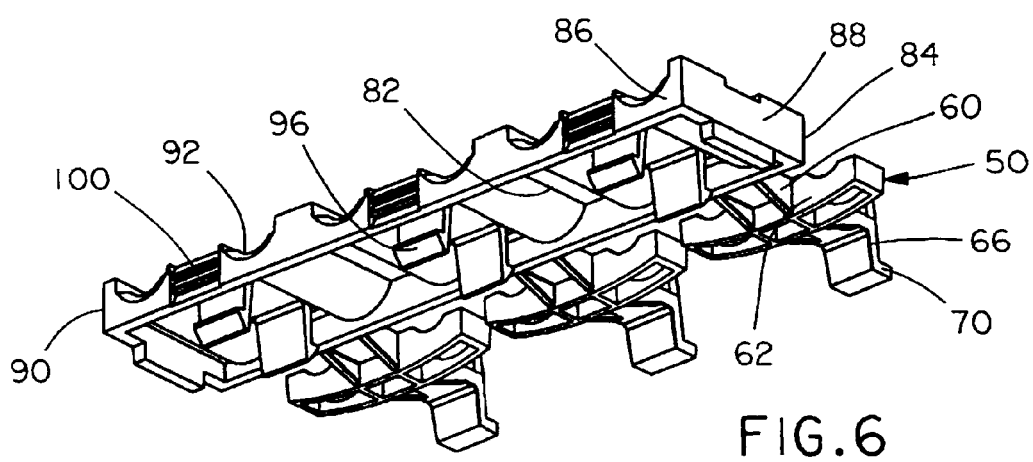
FIG. 6 illustrates a rear bottom perspective view of the strain relief clamps illustrated in FIG. 3.

FIG. 3 illustrates the support bar 30 and the strain relief clamps 50. The support bar 30 includes a horizontal member 32, a vertical member 34, a first end 36 and a second end 38. The first end 36 and the second end 38 have openings 40 for receiving fasteners to secure the support bar 30 to an equipment rack 120. As shown in FIG. 2, each end 36, 38 of the support bar 30 is fastened to the rear of the equipment rack 120. The vertical member 34 of the support bar 30 extends between the first end 36 and the second end 38. The horizontal member 32 extends outwardly from the vertical member 34. The horizontal member 32 also extends between the first end 36 and the second end 38. The horizontal member 32 includes a plurality of apertures 42 and a plurality of slots 44 configured to receive the mounting latches 96 and projections 98, respectively, extending from the strain relief clamps 50. The apertures 42 and the slots 44 are arranged in a specific pattern to accommodate the maximum number of strain relief clamps 50 on the support bar 30. FIG. 3 also illustrates the support bar 30 with a lip 35 that extends downwardly from the free end of the horizontal member 32. It is contemplated that the support bar 30 may also be manufactured without the downwardly extending lip 35.

FIGS. 3-6 illustrate the strain relief clamp 50 in an open position. The strain relief clamp 50 includes a body member 52 with a plurality of latch members 54 integrally formed with the body member 52. The latch members 54 are pivotally attached to a first side 84 of the body member 52 by living hinges 56. Each hinge 56 enables the latch members 54 to be freely rotated from an open position to a closed position.

Each latch member 54 includes a latch body 60 with two latch arms 62 that extend outwardly in opposite directions from the latch body 60. The bottom of each latch arm 62 has a generally arcuate guide 64 that accommodates a cable when the latch members 54 are in the closed positioned. The free end of each latch member 54 includes a tab 66 with a latch 68 at one end for locking the strain relief clamp 50 and a release lever 70 at the opposite end for disengaging the latch 68 to unlock the strain relief clamp 50.

The body member 52 includes a top 80, a bottom 82, first and second sides 84, 86, respectively, and first and second ends 88, 90, respectively. The top 80 of the body member 52 includes a plurality of cable guides 92 for housing the cables 126 in the system. The cable guides 92 have an arcuate shape for accommodating the cables 126 positioned therein. As will be discussed below, the arcuate cable guide 92 in the body member 52 is designed to receive cables having varying diameters. The top 80 of the body member 52 also includes a plurality of notches 94. The notches 94 have a generally rectangular shape for accommodating a portion of the latch arms 62 when the latch arms 62 are in the closed position.

As discussed above, the latch members 54 extend from a first side 84 of the body member 52. The second side 86 of the body member 52 includes a plurality of latching teeth 100. The latching teeth 100 are arranged in sets that include two teeth, however, it is contemplated that the number of latching teeth may vary. The latching teeth 100 are positioned at spaced intervals where one set of the latching teeth 100 is aligned with one of the tabs 66 of the latch members 54. As a result, when the latch members are pivoted to a closed position, the latch tabs 68 are able to engage the latching teeth to secure the strain relief clamp in a closed position.

The bottom 82 of the body member 52 includes a plurality of mounting latches 96 that extend downwardly from the bottom 82 of the body member 52. The mounting latches 96 are positioned adjacent to the underside of each of the cable guides 92. The mounting latches 96 are snap fit into the apertures 42 in the support bar 30 thereby securing the strain relief clamp 50 to the support bar 30 as illustrated in FIGS. 1 and 2.

Each end 88, 90 of the body member 52 includes a projection 98 that extends downwardly from the ends 88, 90.

The slots 44 in the support bar 30 receive the projections 98 to further align the strain relief clamp 50 to the support bar 30.

Figure 7:
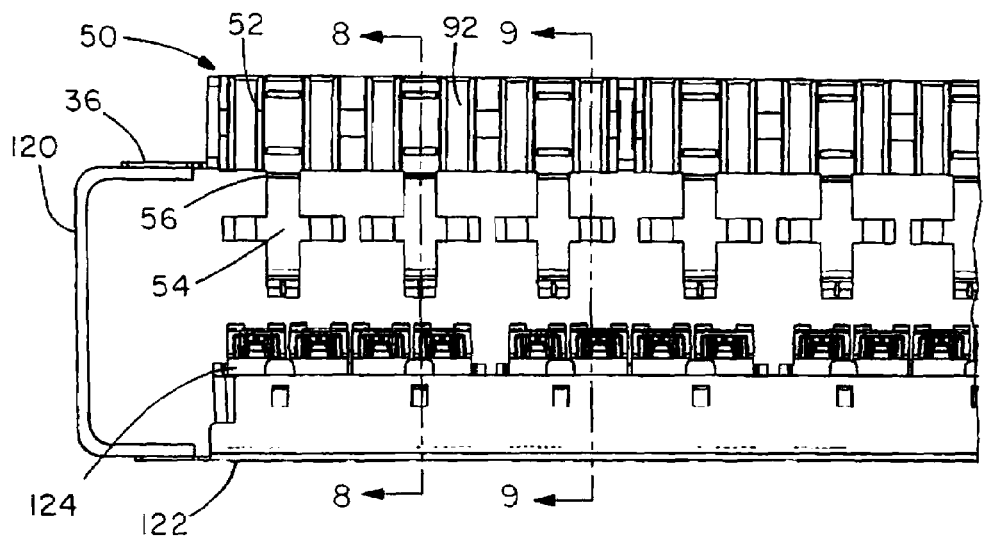
FIG. 7 illustrates a top view of the cable management support bar with strain relief clamps secured to an equipment rack.
Figure 8:
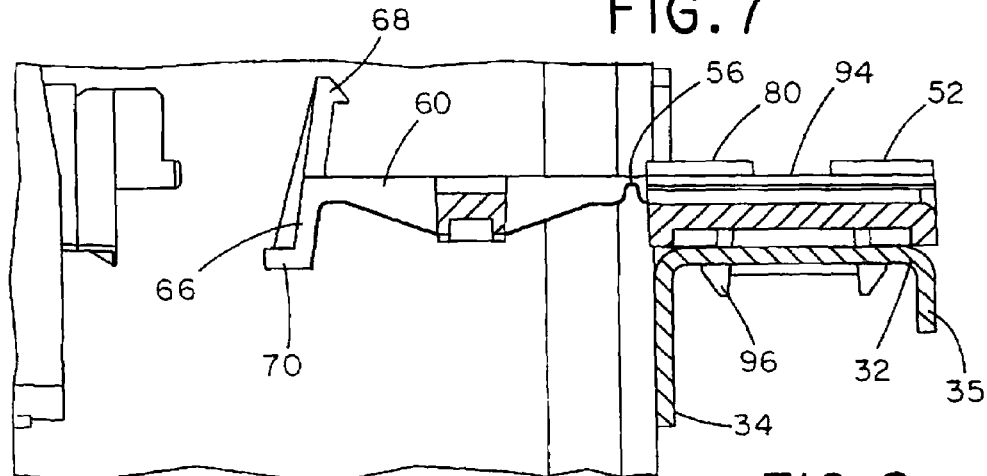
FIG. 8 illustrates a cross sectional view of one of the strain relief clamps taken along line 8-8 of FIG. 7.
Figure 9:
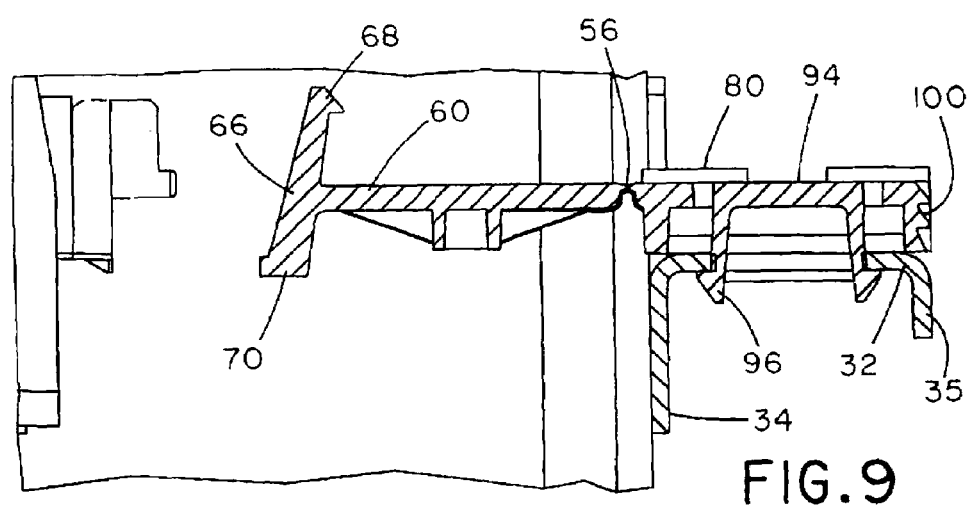
FIG. 9 illustrates a cross sectional view of one of the strain relief clamps taken along line 9-9 of FIG. 7.

FIGS. 7-9 illustrate the strain relief clamps 50 installed in the support bar 30 that is secured to the rear of the equipment rack 120. The strain relief clamps 50 are arranged such that each cable guide 92 is aligned with one of the modules 124 installed in the patch panel 122 to provide a path for the cables 126 that extend from the modules 124. As shown in FIGS. 8 and 9, the mounting latches 96 extending from the body member 52 of the clamp 50 are disposed within the apertures 42 in the support bar 30. The mounting latches 96 engage the bottom of the support bar 30 to secure the strain relief clamps 50 to the support bar 30.

Figure 10:
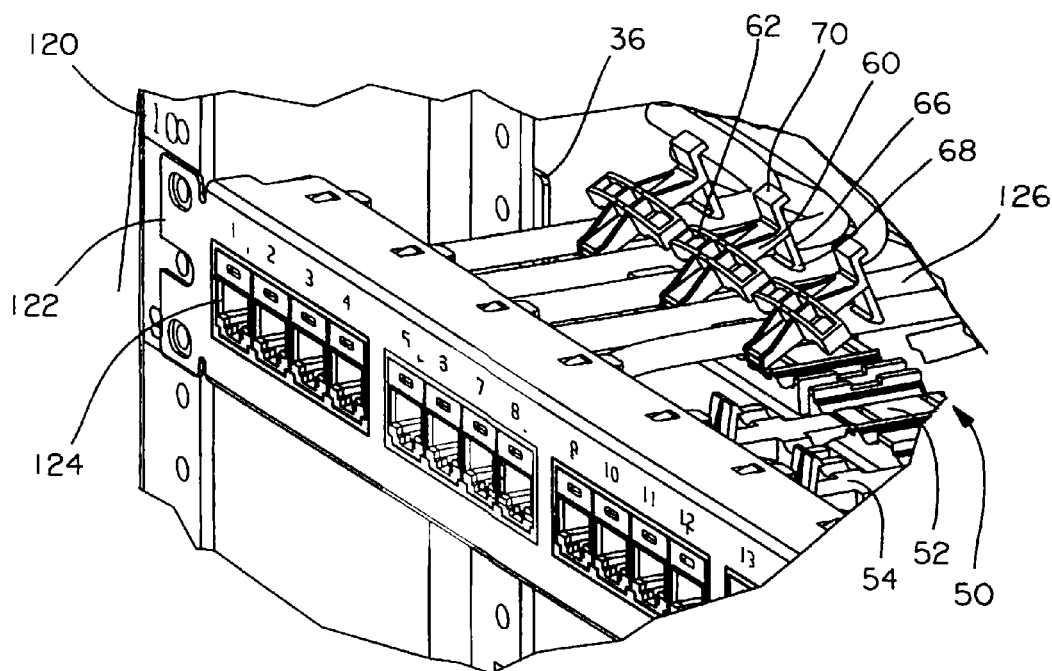
FIG. 10 illustrates a front perspective view of the cable management support bar with the strain relief clamps in an open position.
Figure 11:
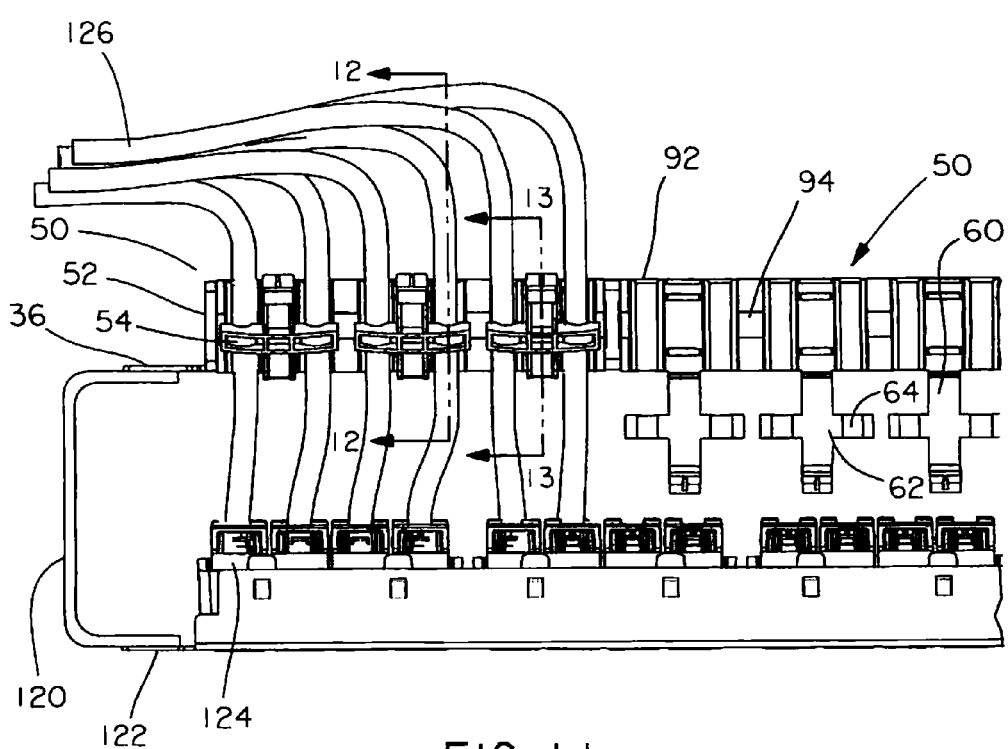
FIG. 11 illustrates a top view of the cable management support bar with the open strain relief clamps of FIG. 10.
Figure 12:
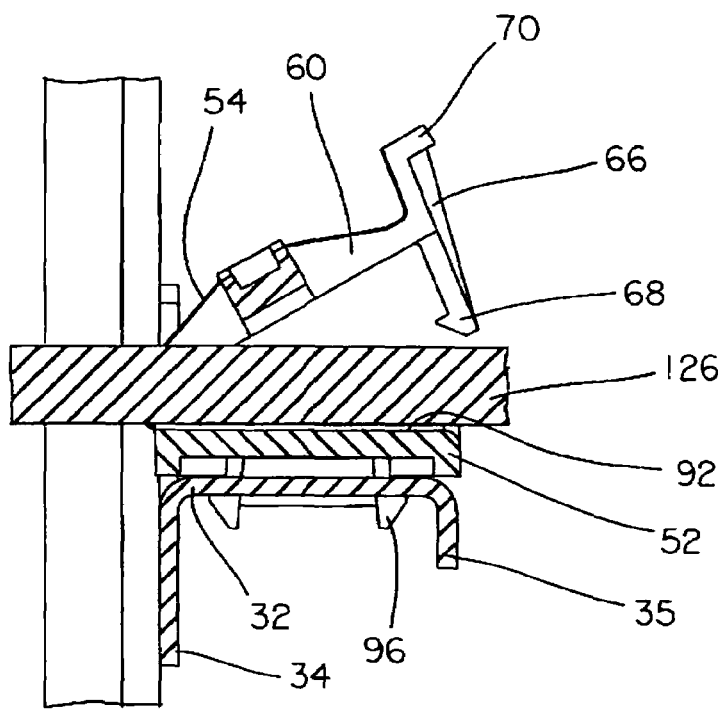
FIG. 12 illustrates a cross sectional view of one of the strain relief clamps taken along line 12-12 of FIG. 11.
Figure 13:
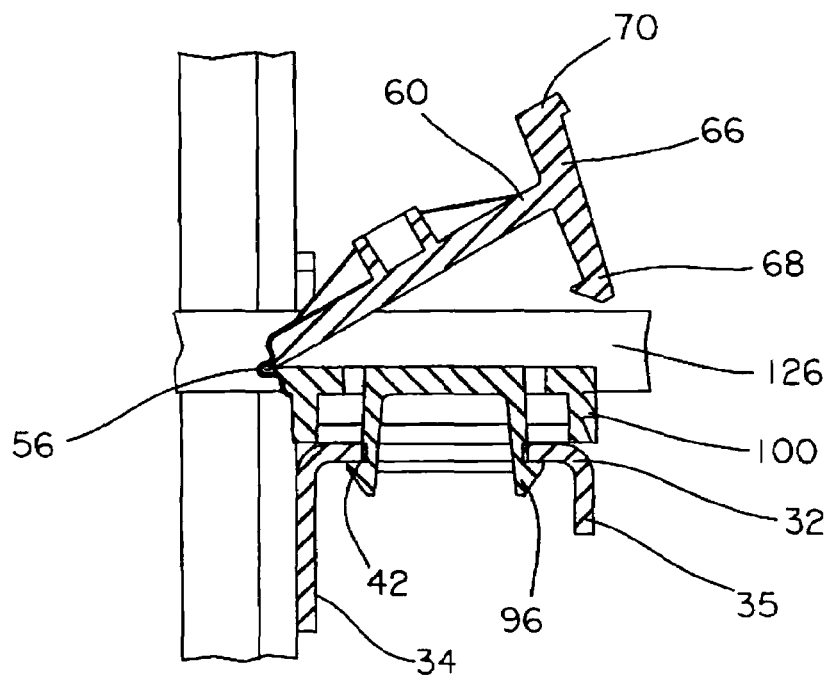
FIG. 13 illustrates a cross sectional view of one of the strain relief clamps taken along line 13-13 of FIG. 11.
Figure 16:
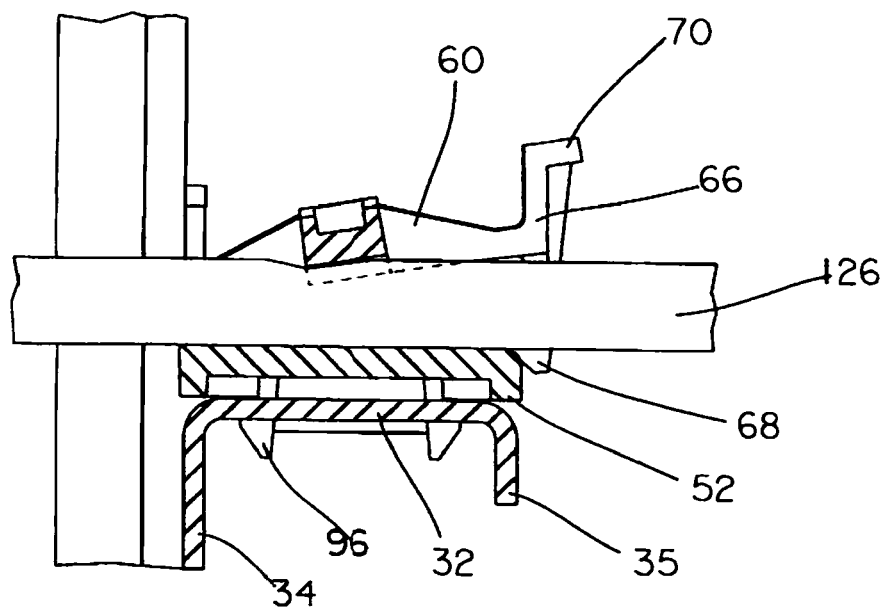
FIG. 16 illustrates a cross sectional view of the cable management support bar with the strain relief clamps taken along line 16-16 of FIG. 14.

FIGS. 10-13 illustrate an equipment rack 120 with a number of cables 126 terminated at the modules 124 in the patch panel 122. As discussed above, the support bar 30 of the present invention is secured to the rear of the equipment rack and the strain relief clamps 50 are installed in the support bar 30 to hold the cables 126. Thus, each cable 126 is positioned in one of the cable guides 92 in the strain relief clamps 50. As shown in FIG. 10, the latch members 54 are pivoted to a partially closed position such that the latch arms 62 are positioned partially over the cables 126 in the cable guides 92.

Once the latch members 54 are pivoted to the closed position, the arms 62 of the latch members 54 engage the cables 126 to hold the cables 126 in place. Additionally, the latch tab 68 engages one of the latching teeth 100 to lock the strain relief clamp 50 in a closed position. When it is desirable to open the strain relief clamp, the release lever 70 is pushed towards the hinge 56 and upwards to disengage the latch tab 68 from the locking teeth 100. Once the latch tab 68 is released, the latch member 54 may be pivoted away from the body member 52 to the open position.

The strain relief clamps of the present invention are designed to secure cables of various sizes that may be terminated at the modules. The strain relief clamp is designed to clamp cables having a diameter of approximately 0.19 inch to 0.31 inch, however, it is contemplated that the clamp may be designed to accommodate cables having a smaller or larger diameter. Additionally, the strain relief clamp may accommodate a relatively flat cable having a nominal cross section of approximately 0.365 inch by 0.165 inch. However, it is contemplated that the strain relief clamp may also accommodate flat cables having smaller dimensions. For example, FIGS. 14-17 illustrate the strain relief clamps securing cables having a large diameter, FIGS. 18-21 illustrate the strain relief clamps securing relatively flat cables and FIGS. 22-25 illustrate the strain relief clamps securing cables having a small diameter.

Figure 17:
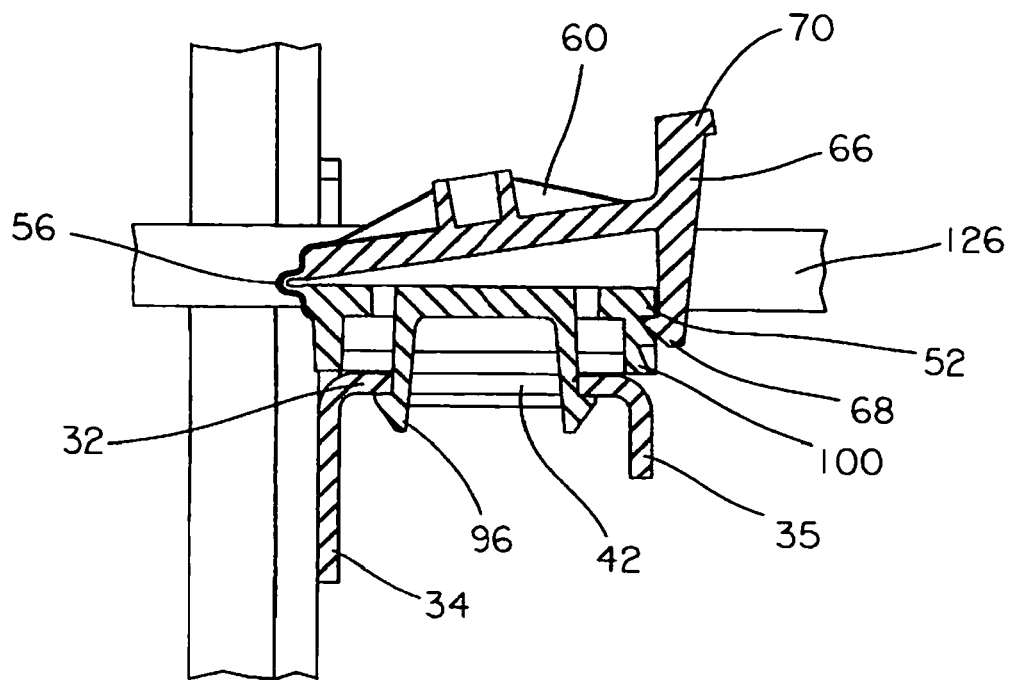
FIG. 17 illustrates a cross sectional view of the cable management support bar with the strain relief clamps taken along line 17-17 of FIG. 14.
Figure 20:
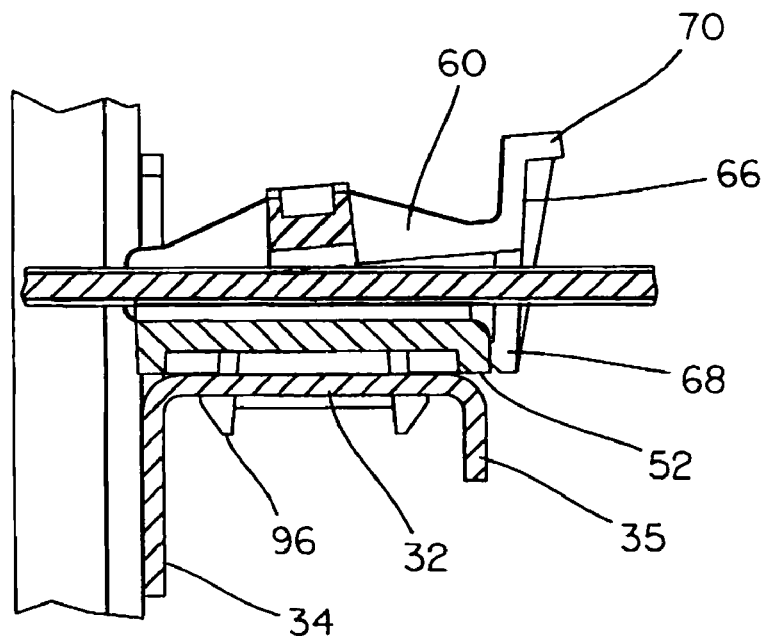
FIG. 20 illustrates a cross sectional view of the cable management support bar with the strain relief clamps taken along line 20-20 of FIG. 18.
Figure 21:
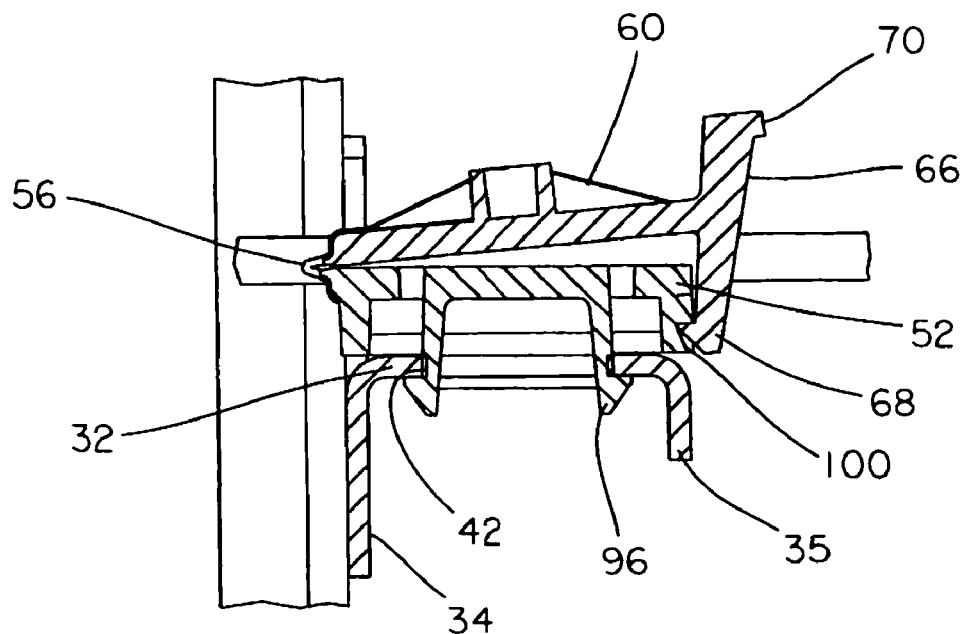
FIG. 21 illustrates a cross sectional view of the cable management support bar with the strain relief clamps taken along line 21-21 of FIG. 18.

As shown in FIG. 14, the strain relief clamps 50 are in the closed position securing a cable having a large diameter. FIG. 15 illustrates the cables disposed in the arcuate cable guides 92 and the latch arms 62 of the strain relief clamps 50 positioned over a top portion of the cable having a large diameter to secure the cables within the strain relief clamps. As illustrated in FIG. 17, since the diameter of the cable is relatively large, the latch tab 68 only engages the first latching tooth to lock the strain relief clamp 50 in the closed position.

As shown in FIG. 18, the strain relief clamps 50 are in the closed position securing a relatively flat cable. Thus, as illustrated in FIG. 19, the flat cable is disposed between the latching arms 62 and the cable guides 92 such that the latching arms 62 and the cable guides 92 engage the outer edges of the flat cable to secure the flat cable in the strain relief clamp. Also, since the flat cable occupies less space in the strain relief clamp than the cable having a large diameter, the latch tab 68 engages the second latching tooth to lock the strain relief clamp 50 in the closed position.

Figure 22:
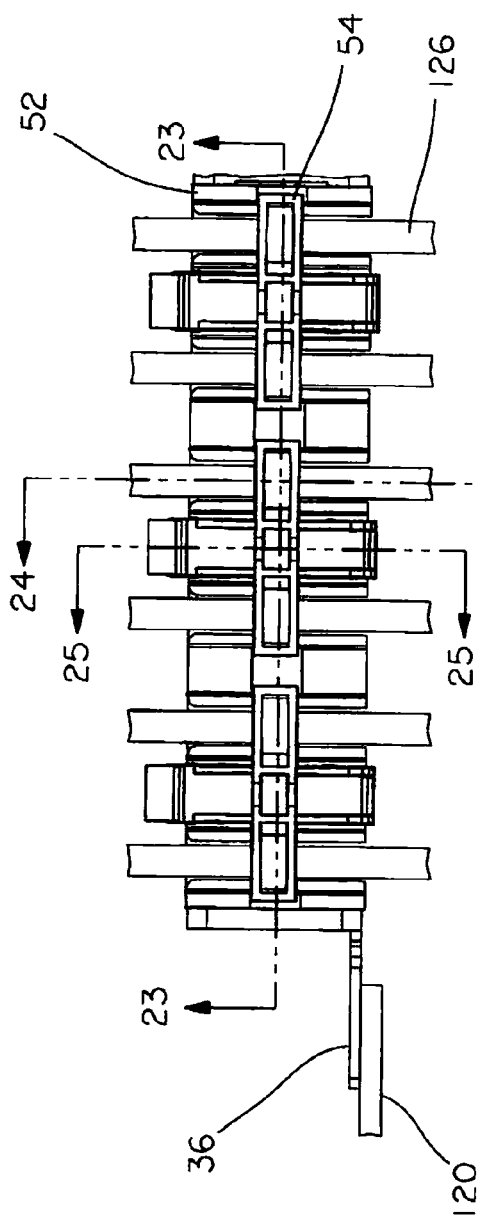
FIG. 22 illustrates a top view of the cable management support bar with the strain relief clamps of the present invention securing a cable having a small diameter.
Figure 23:
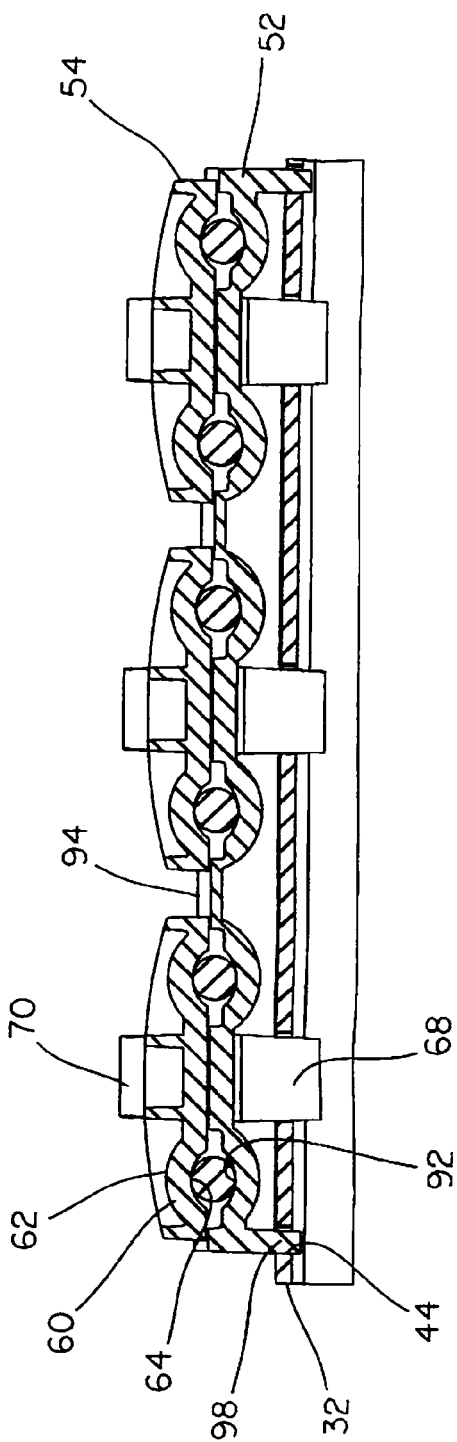
FIG. 23 illustrates a cross sectional view of the cable management support bar with the strain relief clamps taken along line 23-23 of FIG. 22.
Figure 24:
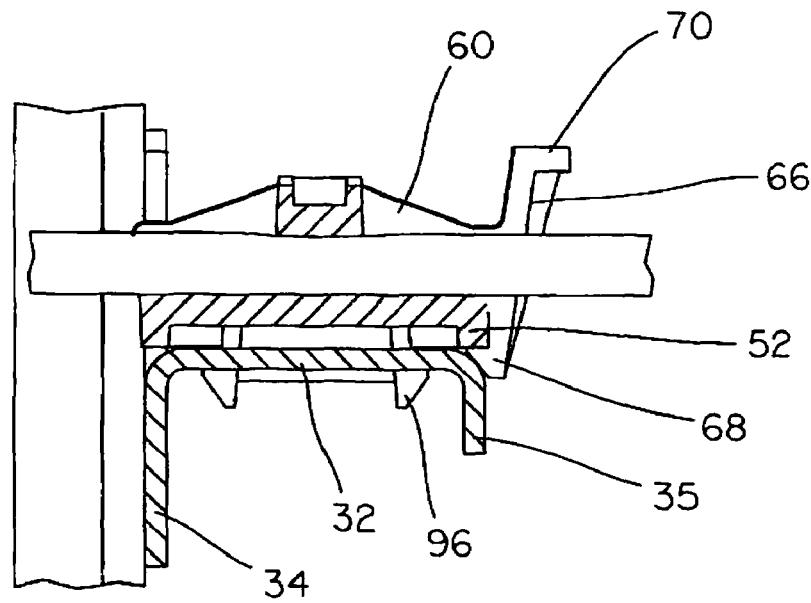
FIG. 24 illustrates a cross sectional view of the cable management support bar with the strain relief clamps taken along line 24-24 of FIG. 22.
Figure 25:
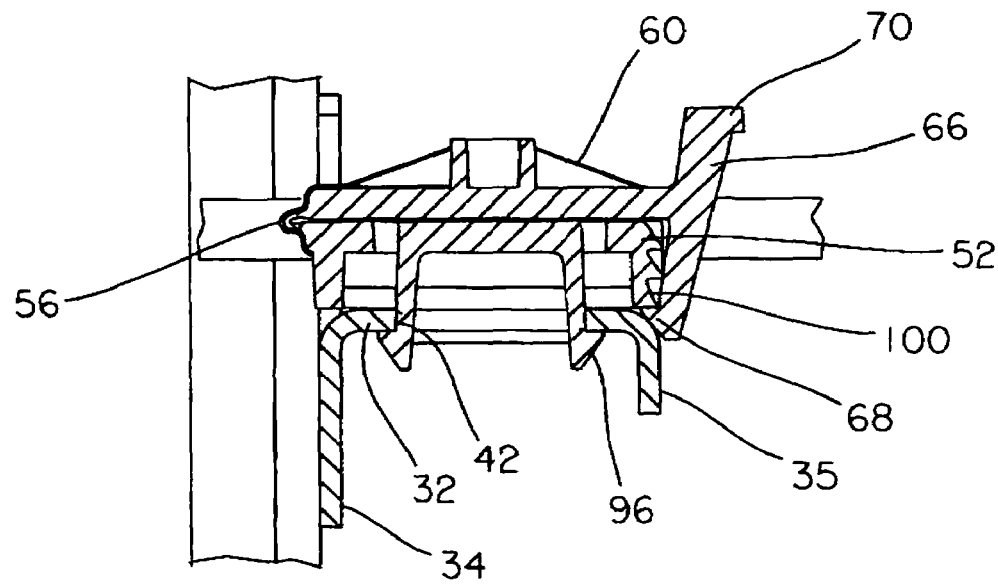
FIG. 25 illustrates a cross sectional view of the cable management support bar with the strain relief clamps taken along line 25-25 of FIG. 22.

As shown in FIG. 22, the strain relief clamps 50 are in the closed position securing a cable having a small diameter. As illustrated in FIG. 23, the cable is positioned in the arcuate cable guide 92 and the latching arms 62 cover the top portion of the cable to secure the cable in the strain relief clamp 50. When the latching arms 62 are pivoted to the closed position over the cable, a portion of the latching arms 62 are disposed within the notches 94 in the top 80 of the body member 52 of the strain relief clamp 50. As illustrated in FIG. 25, since the diameter of the cable is relatively small, the latch tab 68 engages the bottom 82 of the body member 52 to lock the strain relief clamp 50 in the closed position.

Figure 26:
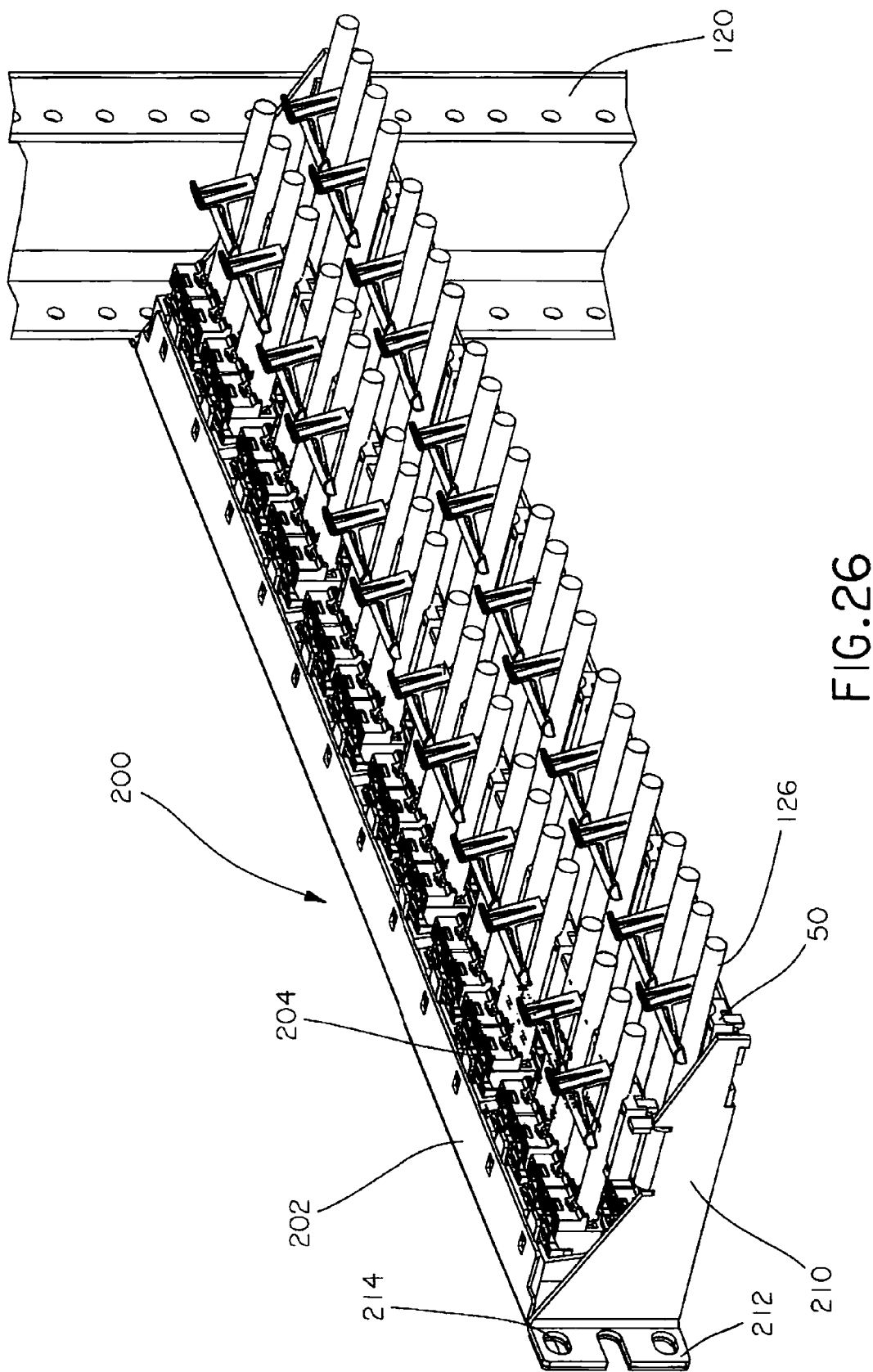
FIG. 26 illustrates a rear perspective view of a high density patch panel with the strain relief clamps of the present invention.
Figure 27:
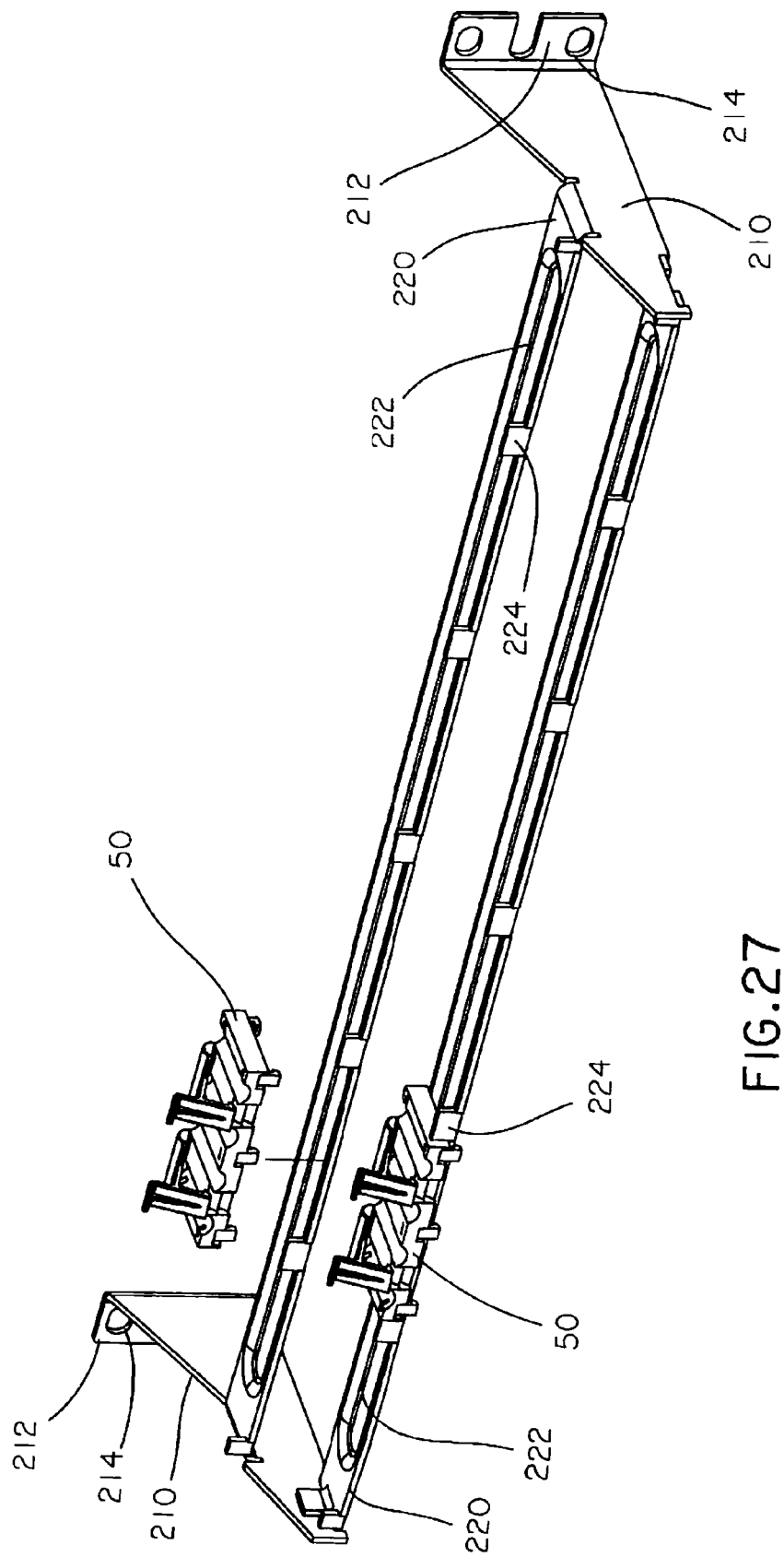
FIG. 27 illustrates a rear perspective view of the bracket and strain relief clamps used with the high density patch panel of FIG. 26.

The strain relief clamps of the present invention hold the network cables in place and relieve the strain exerted on the cables as the cables are routed through the system. As shown in FIG. 26, the strain relief clamps may be used with high density patch panels 200. FIG. 26 illustrates a high density patch panel frame 202 with a plurality of apertures 204 having connectors mounted therein. A pair of brackets 210 extend rearwardly from the ends of the patch panel frame 202. As shown in FIG. 27, each bracket 210 includes an end 212 with a plurality of mounting openings 214 configured to receive fasteners to secure the bracket 210 to the equipment rack. A number of support bars 220 are attached to the brackets 210 such that the support bars 220 extend between the pair of brackets 210. The support bars 220 have an aperture 222 for receiving the strain relief clamps 50 and a number of retainers 224 for retaining the strain relief clamps 50. The support bars 220 are positioned at varying heights to enable the strain relief clamps 50 to accommodate the cables extending from the connectors of the high density patch panel.

Additionally, the strain relief clamps may be used with angled patch panels. The strain relief clamps may also be installed on support bars arranged in staggered rows (see FIGS. 26 and 27) or may be installed on other devices such as rack mount trays or drawers.

Furthermore, while the particular preferred embodiments of the present invention have been shown and described, it will be obvious to those skilled in the art that changes and modifications may be made without departing from the teaching of the invention. The matter set forth in the foregoing description and accompanying drawings is offered by way of illustration only and not as limitation. The actual scope of the invention is intended to be defined in the following claims when viewed in their proper perspective based on the prior art.

The invention claimed is:

1. A clamp for securing cables in a cable management system, the clamp comprising:
  a body member having at least one cable guide; and
  at least one latch member integrally formed with the body member, the latch member having a latch body and a plurality of latch arms protruding from the latch body; wherein the at least one latch member pivots from an open position to a closed position where the plurality of latch arms are disposed over the at least one cable guide for securing a cable positioned therein.

2. The clamp of claim 1, wherein the at least one latch member is pivotally attached to the body member by a hinge.

3. The clamp of claim 1, wherein the at least one cable guide is arcuate.

4. The clamp of claim 1, wherein the body member includes mounting latches for securing the clamp to the cable management system.

5. The clamp of claim 1, wherein the arms have an arcuate bottom surface.

6. The clamp of claim 1, wherein the at least one latch member has a latch for lockingly engaging at least one of the body member and one or more teeth to lock the clamp in the closed position.

7. The clamp of claim 6, wherein the at least one latch member has a release lever for disengaging the latch from at least one of the body member and the one or more teeth.

8. The clamp of claim 1, wherein the body member has a notch for accommodating the arms of the latch member in the closed position.

9. The clamp of claim 1, wherein at least two latch arms protrude from the latch body in opposite directions.

10. A device for securing cables in a cable management system, the device comprising:
  a bar;
  a clamp secured to the bar, the clamp having a body member having at least one cable guide; and at least one latch member integrally formed with the body member, the latch member having a latch body and a plurality of latch arms protruding from the latch body; wherein the at least one latch member pivots from an open position to a closed position where the plurality of latch arms are disposed over the at least one cable guide for securing a cable therein.

11. The device of claim 10, wherein the body member has two cable guides.

12. The device of claim 10, wherein the bar has a horizontal member with a plurality of apertures for receiving the clamp.

13. The device of claim 12, wherein the body member includes mounting latches that are adapted to be received in the aperture of the bar for securing the clamp to the bar.

14. The device of claim 10, wherein the at least one latch member is pivotally attached to the body member by a hinge.

15. The device of claim 10, wherein the at least one cable guide is arcuate.

16. The device of claim 10, wherein the arms have an arcuate bottom surface.

17. The clamp of claim 10, wherein the at least one latch member has a latch for lockingly engaging at least one of the body member and one or more teeth to lock the clamp in the closed position.

18. The clamp of claim 17, wherein the at least one latch member has a release lever for disengaging the latch from at least one of the body member and the one or more teeth.

19. The device of claim 10, wherein the body member has a notch for accommodating the arms of the latch member in the closed position.

20. The device of claim 10, wherein at least two latch arms protrude from the latch body in opposite directions.

21. A cable management system comprising:
  a patch panel having a frame with a plurality of apertures for mounting connectors therein;
  a pair of brackets extending rearwardly from the patch panel frame;
  a support bar attached to the brackets; and clamps secured to the support bar, the clamps having a body member with at least one cable guide and at least one latch member integrally formed with the body member; the latch member having a latch body and a plurality of latch arms protruding from the latch body, wherein the at least one latch member pivots from an open position to a closed position where the plurality of latch arms are disposed over the at least one cable guide for securing a cable therein.

22. The cable management system of claim 21, further comprising a plurality of support bars.

23. The cable management system of claim 22, wherein the plurality of support bars are attached to the brackets at varying heights.

24. The cable management system of claim 21, wherein at least two latch arms protrude from the latch body in opposite directions.

25. A clamp for securing cables in a cable management system, the clamp comprising:

a body member having at least one cable guide; and at least one latch member integrally formed with the body member, the latch member having at least one arm;

wherein the at least one latch member pivots from an open position to a closed position where the at least one arm is disposed over the at least one cable guide for securing a cable positioned therein;

wherein the body member has a plurality of teeth and the at least one latch member has a latch for lockingly engaging one of the plurality of teeth to lock the clamp in the closed position; and wherein the at least one latch member has a release lever for disengaging the latch from the teeth.

26. A device for securing cables in a cable management system, the device comprising:

a bar;

a clamp secured to the bar, the clamp having a body member having at least one cable guide; and at least one latch member integrally formed with the body member, the latch member having arms;

wherein the at least one latch member pivots from an open position to a closed position where the arms are disposed over the at least one cable guide for securing a cable therein;

wherein the body member has a plurality of teeth and the at least one latch member has a latch for lockingly engaging one of the plurality of teeth to lock the clamp in the closed position; and wherein the at least one latch member has a release lever for disengaging the latch from the teeth.

* * * * *